US012177956B2

(12) United States Patent
Oomori et al.

(10) Patent No.: US 12,177,956 B2
(45) Date of Patent: Dec. 24, 2024

(54) MICROWAVE TREATMENT DEVICE

(71) Applicant: Panasonic Intellectual Property Management Co., Ltd., Osaka (JP)

(72) Inventors: Yoshiharu Oomori, Shiga (JP); Daisuke Hosokawa, Shiga (JP); Fumitaka Ogasawara, Hyogo (JP); Mikio Fukui, Shiga (JP); Koji Yoshino, Shiga (JP); Takashi Uno, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 731 days.

(21) Appl. No.: 17/422,824

(22) PCT Filed: Feb. 3, 2020

(86) PCT No.: PCT/JP2020/003933
§ 371 (c)(1),
(2) Date: Jul. 14, 2021

(87) PCT Pub. No.: WO2020/166409
PCT Pub. Date: Aug. 20, 2020

(65) Prior Publication Data

US 2022/0086970 A1 Mar. 17, 2022

(30) Foreign Application Priority Data

Feb. 15, 2019 (JP) ................................ 2019-025293

(51) Int. Cl.
*H05B 6/70* (2006.01)
*H05B 6/72* (2006.01)

(52) U.S. Cl.
CPC ............... *H05B 6/705* (2013.01); *H05B 6/72* (2013.01)

(58) Field of Classification Search
CPC ........ H05B 6/705; H05B 6/72; H05B 6/6408; H05B 6/725; Y02B 40/146
(Continued)

(56) References Cited

U.S. PATENT DOCUMENTS 3,320,396 A * 5/1967 Boehm .................. F24C 7/087 331/88
5,783,807 A * 7/1998 Uehashi ................ H05B 6/642 219/703
2010/0224623 A1 9/2010 Yasui et al.

FOREIGN PATENT DOCUMENTS

CN 101828427 9/2010
EP 2 205 043 7/2010
(Continued)

OTHER PUBLICATIONS

Extended European Search Report issued Mar. 14, 2022 in corresponding European Patent Application No. 20756384.2.
(Continued)

*Primary Examiner* — Quang T Van
(74) *Attorney, Agent, or Firm* — Wenderoth, Lind & Ponack, L.L.P.

(57) ABSTRACT

A microwave treatment device includes a heating chamber for accommodating a heating target, a microwave generator, a feeder, a detector, and a controller. The microwave generator generates a microwave having a frequency in a specified frequency band. The feeder radiates the microwave inside the heating chamber. The detector detects a reflected microwave power reflected from the heating chamber. The controller causes the microwave generator to execute a frequency sweeping in the specified frequency band, and controls the microwave generator according to a temporal change in a frequency characteristic of the reflected microwave power. The temporal change in the frequency characteristic of the reflected microwave power is based on the
(Continued)

frequency of the microwave, a level of the reflected microwave power, and a time passed from a start of heating. Thus, it is possible to accurately recognize the progress of cooking while heating the object.

3 Claims, 5 Drawing Sheets

(58) Field of Classification Search
USPC ....... 219/745, 685, 660, 690, 702, 703, 705, 219/707, 710, 719, 748, 747, 749, 751, 219/757, 761; 99/325, DIG. 14
See application file for complete search history.

(56) References Cited

FOREIGN PATENT DOCUMENTS

| | | |
|---|---|---|
| JP | 56-134491 | 10/1981 |
| JP | 4-080523 | 3/1992 |
| JP | 11-083325 | 3/1999 |
| JP | 2008-108491 | 5/2008 |
| WO | 2009/050893 | 4/2009 |

OTHER PUBLICATIONS

Search Report issued Jul. 29, 2023 in corresponding Chinese Patent Application No. 202080010367.5, with English-language translation.
International Search Report of PCT application No. PCT/JP2020/003933 dated Mar. 31, 2020.

* cited by examiner

MICROWAVE TREATMENT DEVICE

TECHNICAL FIELD

The present disclosure relates to a microwave treatment device having a microwave generator.

BACKGROUND ART

A conventional high frequency heating device is known that changes oscillation conditions such, for example, as the oscillation frequency and the oscillation amplitude level of a semiconductor oscillator according to the level of the power of a reflected wave (see Unexamined Japanese Patent Publication No. S56-134491, for example). This conventional art aims to protect an amplifier from the power of the reflected wave by changing the oscillation conditions.

Another convention device is known that detects a reflected microwave power while sweeping the frequency of the microwave before heating a heating target, and determines a frequency at which the reflected microwave power becomes minimum or local minimum as the frequency of the microwave that is to be outputted (see Unexamined Japanese Patent Publication No. 2008-108491, for example). This conventional device aims, by outputting the microwave having the frequency at which the reflected microwave power becomes minimum or local minimum, to improve the power conversion efficiency, as well as to prevent the microwave generator from being damaged by the reflected microwave power.

Another conventional device is known that calculates an average value of difference between the level of an incident microwave power and the level of a reflected microwave power. When the average value has reached a target average value, the device causes the microwave heating to be finished or temporarily stopped (see Unexamined Japanese Patent Publication No. H11-83325, for example). This conventional device determines completion of a drying treatment based on the average value of difference between the leve51 of the incident microwave power and the level of the reflected microwave power.

In a microwave treatment device, a highly efficient operation can be performed by utilizing the reflected microwave power. To perform cooking properly, however, it is necessary to prepare a device for recognizing the progress of cooking such, for example, as a temperature sensor.

To determine completion of heating based on the level of the reflected microwave power, it is necessary to change the criteria for determination according to the volume of the heating target, the kind of the heating target, desired finish conditions of the heating target, and the like. Therefore, it is difficult to accurately determine completion of heating.

Heating methods and the like other than the microwave heating cannot utilize the reflected power.

SUMMARY OF THE INVENTION

An object of the present disclosure is to provide a microwave treatment device that is capable of desirably cooking various heating targets which differ from one another in shape, kind, volume, and the like, by using a microwave heating and an additional heating device.

A microwave treatment device in one aspect of the present disclosure comprises a heating chamber for accommodating a heating target, a microwave generator, a feeder, a detector, and a controller.

The microwave generator generates a microwave having a frequency in a specified frequency band. The feeder radiates the microwave inside the heating chamber. The detector detects a reflected microwave power reflected from the heating chamber.

The controller causes the microwave generator to execute a frequency sweeping in the specified frequency band. The controller also controls the microwave generator according to a temporal change in a frequency characteristic of the reflected microwave power. The temporal change in the frequency characteristic of the reflected microwave power is based on the frequency of the microwave, a level of the reflected microwave power, and a time passed from a start of heating.

The microwave treatment device in this aspect can accurately recognizes the progress of cooking while heating the heating target. Accordingly, cooking can be finished appropriately.

DESCRIPTION OF EMBODIMENTS

A microwave treatment device in a first aspect of the present disclosure comprises a heating chamber for accommodating a heating target, a microwave generator, a feeder, a detector, and a controller.

The microwave generator generates a microwave having a frequency in a specified frequency band. The feeder radiates the microwave inside the heating chamber. The detector detects a reflected microwave power reflected from the heating chamber.

The controller causes the microwave generator to execute a frequency sweeping in the specified frequency band. The controller also controls the microwave generator according to a temporal change in a frequency characteristic of the reflected microwave power. The temporal change in the frequency characteristic of the reflected microwave power is based on the frequency of the microwave, a level of the reflected microwave power, and a time passed from a start of heating.

In a microwave treatment device in a second aspect of the present disclosure, based on the first aspect, the controller controls the microwave generator according to a temporal change in a frequency of a at least one of a minimum point, a local minimum point, a maximum point, and a local maximum point contained in the frequency characteristic of the reflected microwave power.

A microwave treatment device in a third aspect of the present disclosure, based on the first aspect, further comprises an additional heating device that is different from the microwave generator. The controller controls the additional heating device according to the temporal change in the frequency characteristic of the reflected microwave power.

Hereinafter, an exemplary embodiment of the present disclosure will be described with reference to the drawings.

Figure 1:
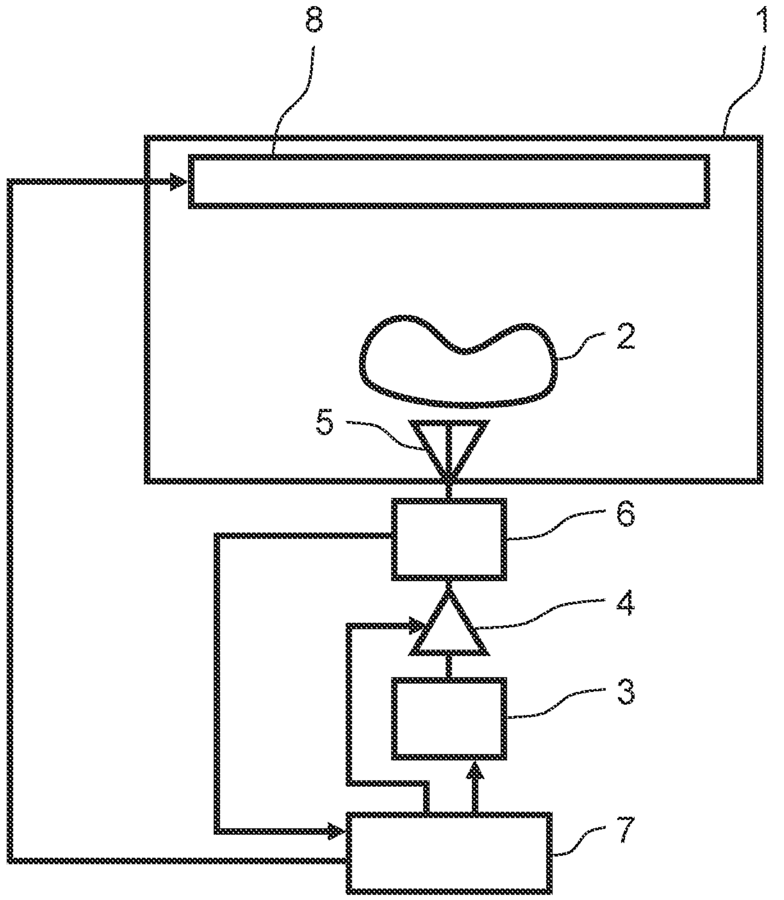
FIG. 1 is a diagram schematically illustrating a configuration of a microwave treatment device according to an exemplary embodiment of the present disclosure.

FIG. 1 schematically illustrates a configuration of a microwave treatment device according to an exemplary embodiment of the present disclosure. As shown in FIG. 1, a microwave treatment device in the present exemplary embodiment comprises heating chamber 1 configured to accommodate heating target 2, oscillator 3, amplifier 4, feeder 5, detector 6, controller 7, and heater 8.

Oscillator 3 generates a microwave having a frequency in a specific frequency band such, for example, as in a range from 2400 MHz to 2500 MHz. Amplifier 4 amplifies the microwave generated by oscillator 3 by a predetermined amplification factor.

Feeder 5 is an antenna that radiates the microwave amplified by amplifier 4 in a direction to heating chamber 1. Heater 8 is, for example, a tube-like heater which is disposed at a ceiling of heating chamber 1 to heat heating target 2 from above by radiation heating. Detector 6 detects a microwave which is a part of the microwave supplied to heating chamber 1 and is reflected and returned from heating chamber 1 without being consumed.

Controller 7 sets the frequency of the microwave generated by oscillator 3 and the amplification factor of amplifier 4. Controller 7 also controls heater 8.

In the present exemplary embodiment, oscillator 3 and amplifier 4 construct a component which corresponds to a microwave generator that generates a desired microwave. Heater 8 corresponds to an additional heater that is different from the microwave generator.

The power of the microwave consumed by heating target 2 and the resonance in heating chamber 1 vary depending on the frequency of the microwave. These variations depending on the frequency cause a change in the amount of the microwave consumed in heating chamber 1. This change in turn causes a change in the level of the reflected microwave power.

Figure 2:
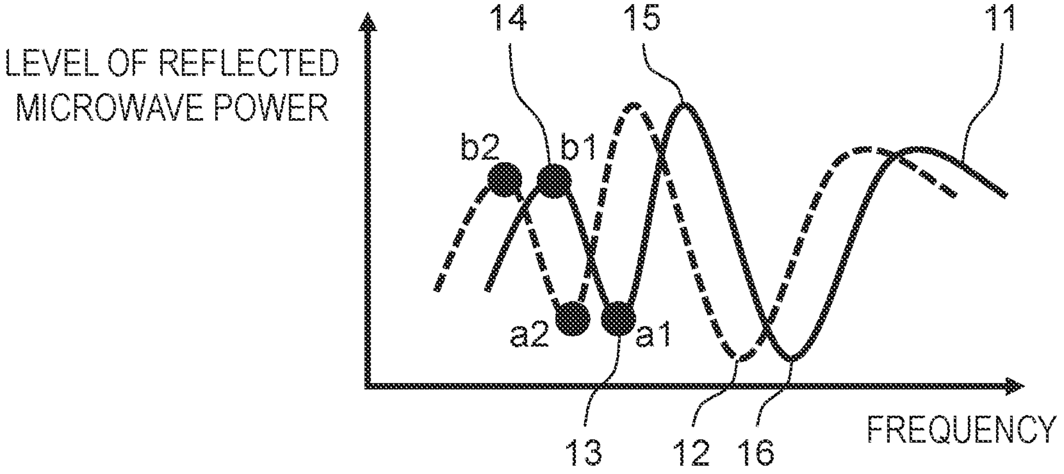
FIG. 2 is a diagram showing a frequency characteristic of a reflected microwave power in the present exemplary embodiment.

FIG. 2 is a diagram showing a frequency characteristic of the reflected microwave power in the present exemplary embodiment. Here, what is referred to as the frequency characteristic of the reflected microwave power is a graph obtained by plotting levels of reflected microwave powers at different frequencies. The graph has a coordinate plane with a horizontal axis representing the frequency and a vertical axis representing the level of the reflected microwave power.

As shown in FIG. 2, frequency characteristic 11 indicated by a solid line shows the reflected microwave powers at respective frequencies at a certain time tl after a start of cooking. Frequency characteristic 11 has local minimum point 13 and local maximum point 14. Also, frequency characteristic 11 has maximum point 15 and minimum point 16 of the reflected microwave power in the frequency band.

When the temperature of heating target 2 changes with the progress of cooking, the frequency at which heating target 2 consumes the microwave most changes with the change in the temperature of heating target 2. In addition, when steam is generated, the generated steam causes a change in the permittivity of the space in heating chamber 1, which in turn causes a change in the resonance frequency of the space in heating chamber 1.

Referring to FIG. 2, frequency characteristic 12 at time t2 later than time t1 is indicated by a broken line. As shown in FIG. 2, due to the changes in the conditions of heating target 2 and the conditions of the space in heating chamber 1, local minimum point 13 moves from point a1 to point a2 at which the frequency is lower than at point a1. Similarly, local maximum point 14 moves from point b1 to point b2 at which the frequency is lower than at point b1. In this way, the frequency characteristic changes as time passes.

Here, local minimum point 13 will be described as an example. In a case of cooking heating target 2 which is high in water content, for example, steam is generated as the cooking progresses. When the steam fills heating chamber 1, the permittivity of the space in heating chamber 1 increases gradually. The increase of the permittivity lowers the resonance frequency of the space. As a result, local minimum point 13 of frequency characteristic 11 gradually shifts from point a1 to the lower frequency side.

Figure 3:
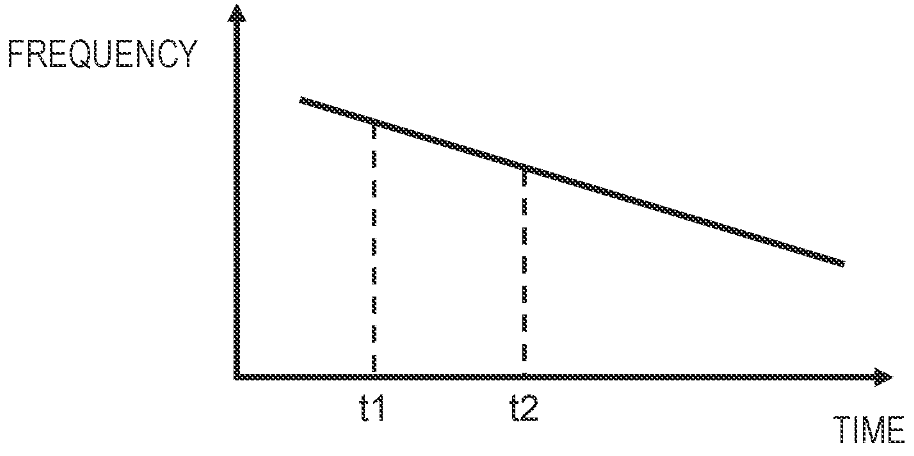
FIG. 3 is a diagram showing a temporal change in the frequency characteristic of the reflected microwave power in the present exemplary embodiment.

FIG. 3 shows changes in the frequency of local minimum point 13 with time expressed as a graph with a horizontal axis representing the time passed from a start of cooking and a vertical axis representing the frequency. As shown in FIG. 3, the frequency of local minimum point 13 changes to be lower as time passes.

In other words, controller 7 may store in advance the temporal change in the frequency of each of local minimum point 13, local maximum point 14, maximum point 15 and minimum point 16, so that controller 7 can recognize the progress of cooking according to the temporal change in the frequency characteristic detected by detector 6.

FIGS. 4A to 4F show various patterns of the temporal change in the frequency characteristic of the reflected microwave power in the present exemplary embodiment.

Figure 4A:
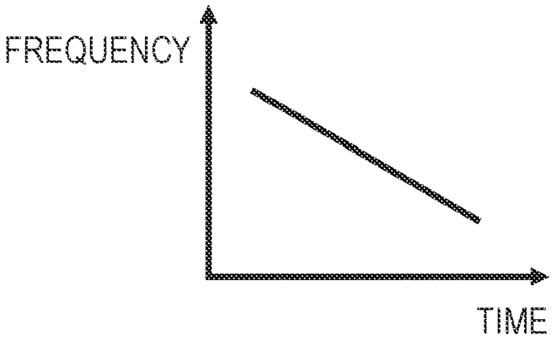
FIG. 4A is a diagram showing a first pattern of the temporal change in the frequency characteristic of the reflected microwave power.

FIG. 4A shows a pattern in which the frequency characteristic shifts to the lower frequency side. This pattern is the same as the pattern shown in FIG. 3. The change shown in FIG. 4A occurs because heating target 2 high in water content generates steam in heating chamber 1 in the course of temperature rising. This phenomenon appears in the middle stage of cooking.

Figure 4B:
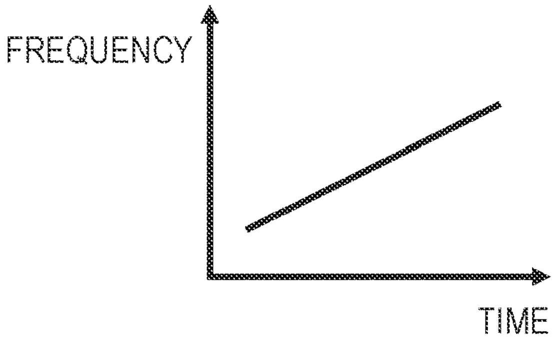
FIG. 4B is a diagram showing a second pattern of the temporal change in the frequency characteristic of the reflected microwave power.

FIG. 4B shows a pattern in which the frequency characteristic shifts to the higher frequency side. The change shown in FIG. 4B occurs when the steam generated from heating target 2 has reduced and the space inside heating chamber 1 has dried. This phenomenon appears in the final stage of cooking.

Figure 4C:
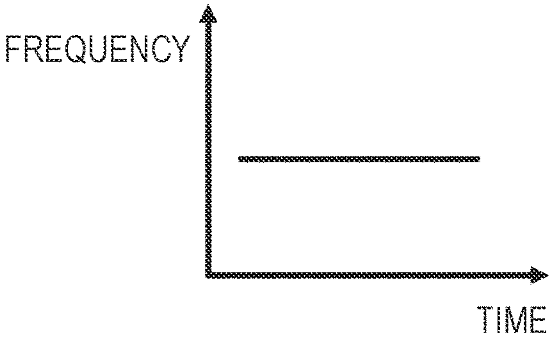
FIG. 4C is a diagram showing a third pattern of the temporal change in the frequency characteristic of the reflected microwave power.

FIG. 4C shows a pattern in which the frequency characteristic changes little. For example, in the case of heating target 2 high in water content such as a stewed dish, the permittivity of the space in heating chamber 1 is stabilized due to the steam filled in heating chamber 1. As a result, the change shown in FIG. 4C occurs. This phenomenon appears after the middle stage of cooking.

Figure 4D:
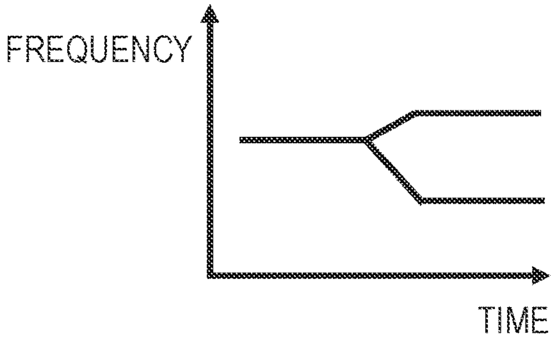
FIG. 4D is a diagram showing a fourth pattern of the temporal change in the frequency characteristic of the reflected microwave power.
Figure 4E:
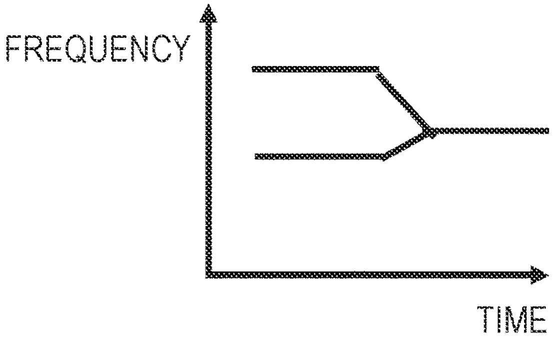
FIG. 4E is a diagram showing a fifth pattern of the temporal change in the frequency characteristic of the reflected microwave power.

FIG. 4D shows a pattern in which one local minimum point 13 is split into two minimum points halfway through cooking. FIG. 4E shows a pattern in which more than two local maximum points 14, for example, becomes one maximum point halfway through cooking. In these cases, plural resonance frequencies exist in heating chamber 1, and electromagnetic field distributions are different from one another at the respective frequencies.

The change in the state of heating target 2 largely affects the electromagnetic field distribution. For example, in a case where the shape of heating target 2 changes largely when a cake rises or pop corns explode, the electromagnetic field distribution changes largely over the entire frequency band. In this case, the change in the frequency characteristic as shown in FIG. 4D or 4E will occur. This phenomenon appears after the middle stage of cooking.

Figure 4F:
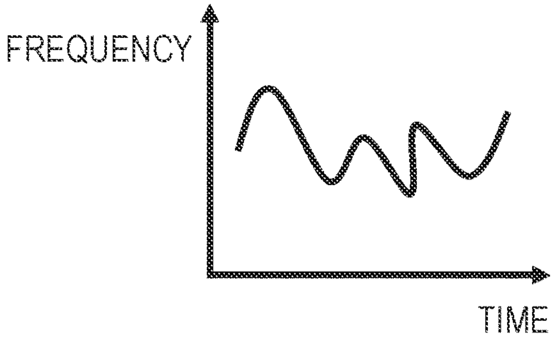
FIG. 4F is a diagram showing a sixth pattern of the temporal change in the frequency characteristic of the reflected microwave power.

FIG. 4F shows a pattern in which the frequency changes randomly as time passes. In a case where heating target 2 is soup, for example, the liquid surface ripples due to boiling and steam is generated randomly. As a result, the changes shown in FIG. 4*f* occur. This phenomenon appears after the middle stage of cooking.

As described above, it is possible to recognize the progress of cooking according to the temporal change in the frequency of at least one of local minimum point 13, local maximum point 14, maximum point 15 and minimum point 16.

Figure 5A:
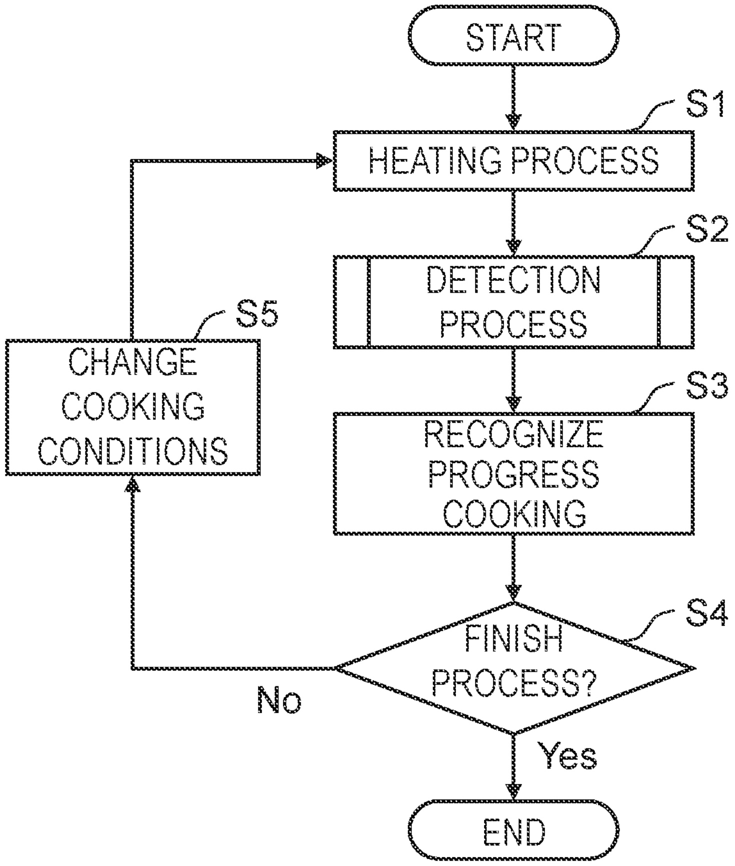
FIG. 5A is a flowchart showing a control flow according to the present exemplary embodiment.
Figure 5B:
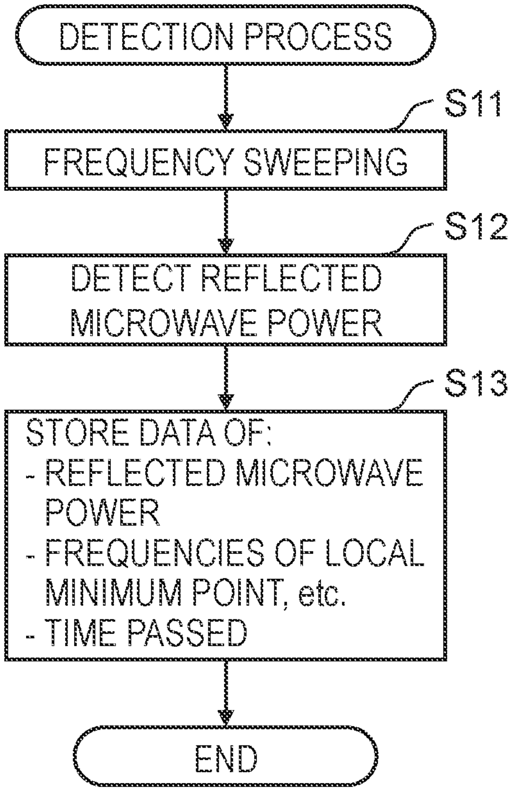
FIG. 5B is a flowchart showing a control flow according to the present exemplary embodiment.

FIGS. 5A and 5B show flows of a cooking control using the temporal change in the frequency characteristic. FIG. 5A is a flowchart of a main process, and FIG. 5B is a flowchart showing details of a detection process.

As shown in FIG. 5A, controller 7 performs, at step S1, a heating process by controlling the microwave generator and heater 8 according to set cooking conditions. Controller 7 causes either the microwave heating alone or both the microwave heating and the radiation heating to heat heating target 2.

A detection process is executed at step S2. The detection process will be described with reference to FIG. 5B. At step S11, controller 7 causes oscillator 3 to execute a frequency sweeping in which oscillator 3 outputs a microwave while gradually changing the frequency of the microwave. In the present exemplary embodiment, oscillator 3 changes the oscillation frequency in steps of 1 MHz in a range from 2400 MHz to 2500 MHz.

At step S12, detector 6 detects the reflected microwave power received during the frequency sweeping. At step S13, controller 7 identifies the frequency of each of the local minimum point, the local maximum point, the maximum point, and the minimum point contained in the frequency characteristic based on the level of the detected reflected microwave power. Controller stores data including the detected level of the reflected microwave power, the frequency of each of the local minimum point, the local maximum point, the maximum point and the minimum point, and the time passed after the start of cooking. After step S13, the process flow returns to the main process.

Referring back to FIG. 5A, controller 7 obtains, at step S3 the temporal change in the frequency characteristic of the reflected microwave power based on the data stored in step S13 and recognizes the progress of cooking according to the temporal change in the frequency characteristic of the reflected microwave power. At step S4, controller 7 determines whether to finish the process or to continue the process according to the progress of cooking.

In a case of finishing the process, controller 7 causes the cooking to be finished. In a case of continuing the process, controller 7 changes, at step S5, the cooking conditions as needed. Thereafter, controller 7 returns the process to step S1 to continue the heating process.

INDUSTRIAL APPLICABILITY

The microwave treatment device according to the present disclosure is applicable to consumer-use cookers and, in addition, to industrial-use heating equipment including, for example, drying machines, pottery kilns, waste disposers, semiconductor manufacturing equipment, and chemical reactors.

REFERENCE MARKS IN THE DRAWINGS

1 heating chamber
2 object to be heated
3 oscillator
4 amplifier
5 feeder
6 detector
7 controller
8 heater
11, 12 frequency characteristic
13 local minimum point
14 local maximum point
15 maximum point
16 minimum point

The invention claimed is:

1. A microwave treatment device comprising:
a heating chamber configured to accommodate a heating target;
a microwave generator configured to output a microwave having a frequency in a specified frequency band;
a feeder configured to radiate the microwave inside the heating chamber;
a detector configured to detect a reflected microwave power reflected from the heating chamber; and
a controller configured to cause the microwave generator to execute a frequency sweeping in the specified frequency band, and to control the microwave generator according to a temporal change in a frequency characteristic of the reflected microwave power, the temporal change in the frequency characteristic of the reflected microwave power being based on the frequency of the microwave, a level of the reflected microwave power, and a time passed from a start of heating,
wherein the controller is further configured to store the temporal change in the frequency characteristic with the time passed from the start of heating, to recognize a progress of cooking of the heating target based on the temporal change in the frequency characteristic, and to control the microwave generator according to the progress of cooking of the heating target.

2. The microwave treatment device according to claim 1, wherein the controller is further configured to control the microwave generator according to a temporal change in a frequency of at least one of a local minimum point, a local maximum point, a maximum point, and a minimum point contained in the frequency characteristic of the reflected microwave power.

3. The microwave treatment device according to claim 1, wherein the controller is further configured to determine whether to continue or finish a cooking process of the microwave treatment device according to the progress of cooking, and to change cooking conditions as needed when continuing the cooking process.

* * * * *